United States Patent
Caron

(10) Patent No.: US 7,621,184 B2
(45) Date of Patent: *Nov. 24, 2009

(54) METHOD OF DETERMINING A SPEED OF ROTATION OF AN AXIALLY SYMMETRICAL VIBRATING SENSOR, AND A CORRESPONDING INERTIAL DEVICE

(75) Inventor: Jean-Michel Caron, Saint-Gratien (FR)

(73) Assignee: Sagem Defense Securite, Paris (FR)

( * ) Notice: Subject to any disclaimer, the term of this patent is extended or adjusted under 35 U.S.C. 154(b) by 48 days.

This patent is subject to a terminal disclaimer.

(21) Appl. No.: 11/898,495

(22) Filed: Sep. 12, 2007

(65) Prior Publication Data

US 2009/0049910 A1    Feb. 26, 2009

(30) Foreign Application Priority Data

Aug. 23, 2007    (FR)    .................................... 07 05976

(51) Int. Cl.
*G01P 9/04*    (2006.01)
(52) U.S. Cl. .................................................. 73/504.13
(58) Field of Classification Search ............. 73/504.13, 73/504.12, 504.04, 504.16, 504.15, 1.37, 73/1.38, 1.77, 1.78
See application file for complete search history.

(56) References Cited

U.S. PATENT DOCUMENTS

| 5,616,864 | A | * | 4/1997 | Johnson et al. .......... 73/504.04 |
| 5,712,427 | A | | 1/1998 | Matthews |
| 7,127,946 | B2 | | 10/2006 | Renault |

FOREIGN PATENT DOCUMENTS

EP    1 445 580 A1    8/2004

* cited by examiner

*Primary Examiner*—Helen C. Kwok
(74) *Attorney, Agent, or Firm*—Muncy, Geissler, Olds & Lowe, PLLC

(57) ABSTRACT

The method of determining the speed of rotation of an axially symmetrical vibrating sensor of order 2. The method includes:

performing a first evaluation of the speed of rotation while a vibration generated by the vibrating sensor lies in a first position relative to electrodes generating the vibration;

applying a precession command so that the vibration comes successively into positions that are offset by 45°, 90°, and 135° relative to the first position;

performing evaluations of the speed of rotation while the vibration lies in the offset positions; and taking a mean of the evaluations of the speed of rotation in the various positions of the vibration.

10 Claims, 2 Drawing Sheets

METHOD OF DETERMINING A SPEED OF ROTATION OF AN AXIALLY SYMMETRICAL VIBRATING SENSOR, AND A CORRESPONDING INERTIAL DEVICE

The present invention relates to a method of determining a speed of rotation of an axially symmetrical vibrating sensor, and to a corresponding inertial device including an axially symmetrical vibrating sensor.

BACKGROUND OF THE INVENTION

In order to determine the orientation of a carrier, in particular in order to navigate an airplane, it is known that an inertial device can be used that comprises one or more axially symmetrical vibrating sensors, each making use of a resonator possessing symmetry of order equal to or greater than 4 and implementing two degenerate modes of vibration that are identical and orthogonal, having an elastic line that possesses periodicity of order n relative to the axis of symmetry, i.e. an elastic line having n times the same vibration pattern over one revolution around the axis of symmetry. In particular, it is known to use sensors of order 2 such as hemispherical bell vibrating sensors including an appropriate number of electrodes, or quapasons for which the vibration orientations of the two modes are not geometrically orthogonal but are modally orthogonal, i.e. modally offset by $\pi$.

It is also known that an axially symmetrical vibrating sensor is adapted to operate in free gyro mode or in rate gyro mode. In free gyro mode the vibration is sustained, but its position is left free; when the orientation of the carrier varies, the position of the vibration relative to its base is representative of the angle through which the carrier has turned.

In rate gyro mode, the vibration is sustained and its position relative to its base is kept constant by delivering suitable electronic commands; the values of said commands are then representative of the speed or rate of rotation of the carrier in inertial space.

It is also known that vibrating gyros present a drift error that is manifested when the gyro is operating in free gyro mode by variation in the position of the vibration even when the carrier is not subject to any rotation. This drift has two components, a constant component, which for a hemispherical resonant gyro is of the order of a few hundredths of a degree per hour, and a component known as alternating drift that is made up of harmonics, mainly a harmonic having the same order n as the vibrating sensor and a harmonic of order twice that of the vibrating sensor, depending on the position of the vibration. With a hemispherical resonator gyro, the harmonic of order n gives rise to a drift error of the order of one degree of per hour and the harmonic of the order 2n gives rise to a drift error of the order of one-tenth of a degree per hour.

It is known to calibrate gyros in a workshop and to draw up correction tables that can be applied while the gyro is in use. Nevertheless, drift error is not only a function of the position of the vibration, but also a function of ambient temperature and of the aging of the gyro. In practice, possibilities for correction are therefore limited.

OBJECT OF THE INVENTION

An object of the invention is to determine the speed of rotation of an axially symmetrical vibrating sensor by minimizing drift error.

SUMMARY OF THE INVENTION

In order to achieve this object, the invention provides a method of determining a speed of rotation of an axially symmetrical vibrating sensor having a vibrating member associated with control electrodes and with detection electrodes for generating vibration presenting an elastic line possessing periodicity of order n and having a position that is variable as a function of the rotation of the sensor, the method comprising the steps of:

performing a first evaluation of the speed of rotation when the vibration is in a first position relative to the electrodes;

applying a precession command using a pre-established scale factor until the vibration reaches a second position geometrically offset by $\pi/n$ relative to the first position;

performing a second evaluation of the speed of rotation while the vibration is in the second position; and taking a mean of the evaluations of the speed of rotation in the first position and in the second position.

This eliminates the effect of the harmonic of order n. The effect of the error that results from the harmonic of order n is linked to the amplitude of said harmonic. For two vibration positions offset by $\pi/n$, the harmonic of order n has amplitudes of the same absolute value but of opposite sign, such that by taking the mean of the evaluations in two positions that are symmetrically offset by $\pi/n$, the modal offset is $\pi$, such that the amplitudes of the error due to the harmonic of order n cancel. Drift error is then minimized regardless of temperature or of the degree of aging of the sensor.

According to an advantageous aspect of the invention, the method further includes the following steps:

applying the precession command to bring the vibration successively into positions that are geometrically offset by $\pi/2n$ and $3\pi/2n$ relative to the first position;

performing evaluations of the speed of rotation for said positions of the vibration; and taking a mean of the evaluations of speed of rotation for all of the evaluations performed.

Thus, not only are the effects of the harmonic of order n eliminated, but so also are those of the harmonic of order 2n. Between a position that is geometrically offset by $\pi/2n$ and a position that is geometrically offset by $3\pi/2n$, the modal offset is $\pi$, such that the harmonic of order n is eliminated in the same manner as above. Furthermore, for the initial position and for the position that is geometrically offset by $\pi/n$, the harmonic of order 2n generates drift errors having the same amplitude and the same sign whereas for the positions that are geometrically offset by $\pi/2n$ and $3\pi/2n$, the harmonic of order 2n generates drift errors having the same amplitudes but of sign opposite to the drift error in the initial position. By taking the mean of the four evaluations, the error due to the harmonic of order 2n is thus eliminated.

The residual drift error is thus small and due to the constant component and also to harmonics of higher orders that could be eliminated by continuing with the above-described method, but that are of amplitudes that are small enough to make this unnecessary, a priori. The error can then be compensated during initial calibration of the device, and the measurement of speed of rotation by the device is then disturbed only by variations in a value that is initially small and that is compensated.

The lack of linearity generated by the electronic encoders used for measuring the angular position of the vibration is at its worst for input values of zero, so the angles used for measuring the speed of rotation are selected to avoid zero values being output by the detection electrodes (i.e. constituting input signals applied to the angle encoders).

For the particular configuration of a hemispherical vibrating gyro used with an elastic line of order 2, i.e. n=2, the angular positions used for eliminating the harmonics of orders 2 and 4 are therefore $\theta 0$, $\theta 2=\theta 0+90°$, $\theta 1=\theta 0+45°$, and $\theta 3=\theta 0+135°$.

It should also be observed that the invention described is based on assuming the differences in measured speeds of rotation in the various positions of the vibration are due to the harmonic drift of the resonator: it is therefore necessary for the speed of rotation applied to the sensor to be constant throughout all of the measurements, otherwise it is not possible to cancel the harmonic drift term. More precisely, the real constraint is that the differences between the speeds of rotation at the periods of time corresponding to the measurements must be known, with a constant speed then corresponding merely to the special case where the difference is zero.

BRIEF DESCRIPTION OF THE DRAWINGS

Other characteristics and advantages of the invention appear on reading the following description of a particular and non-limiting embodiment of the invention with reference to the accompanying figures, in which.

DETAILED DESCRIPTION OF THE INVENTION

Figure 1:
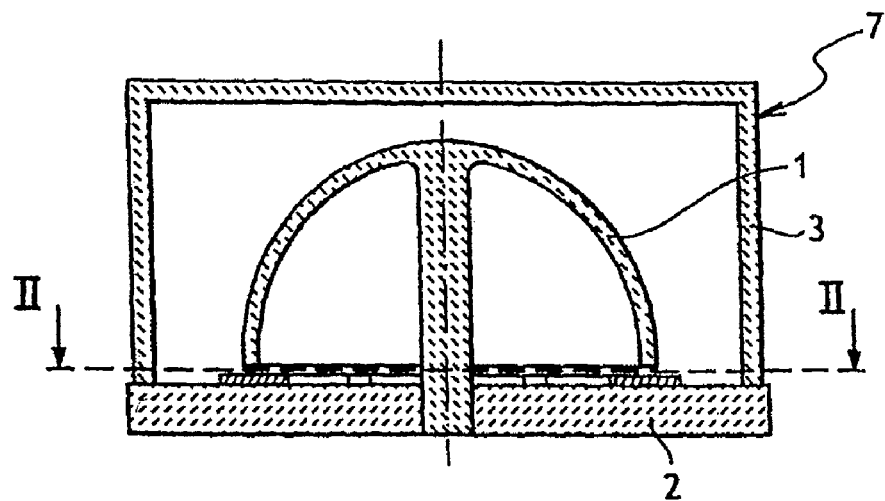
FIG. 1 is a diagrammatic axial section on line I-I of FIG. 2 showing a hemispherical bell vibrating sensor.
Figure 2:
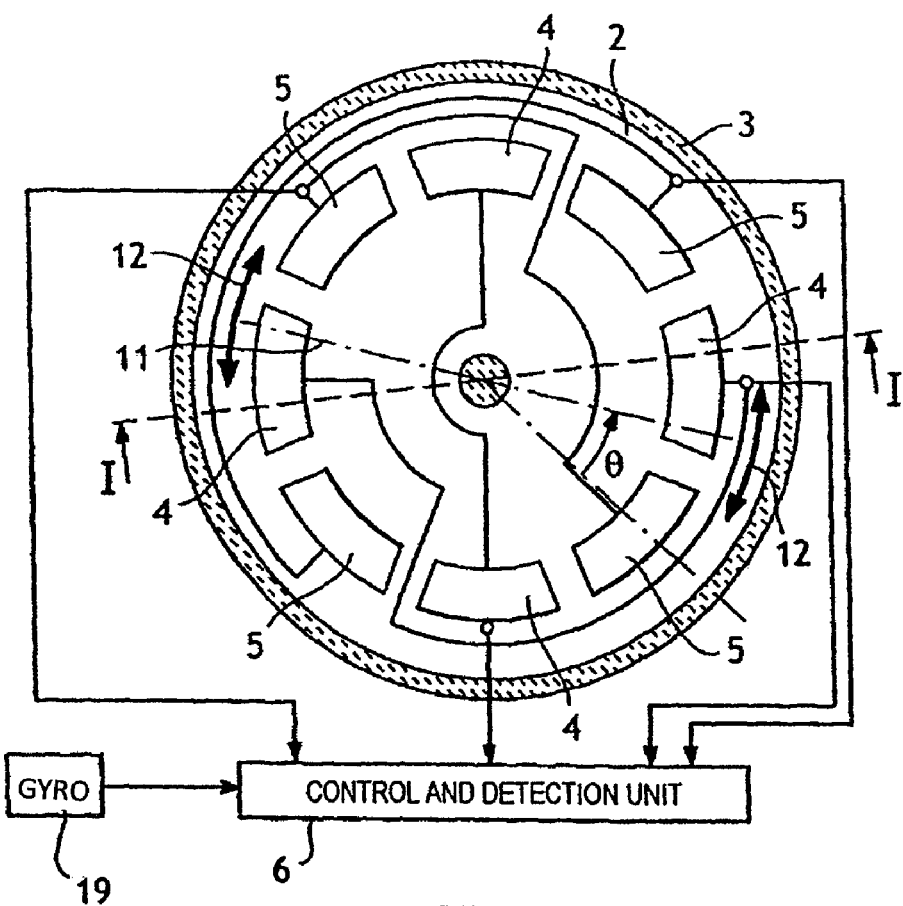
FIG. 2 is a section view on line II-II of FIG. 1.

With reference to FIGS. 1 and 2, the inertial device of the invention is illustrated as a vibrating sensor with an elastic line of order 2. The device comprises a hemispherical bell vibrating sensor 7 comprising in conventional manner a silica bell 1 mounted on a base 2 likewise made of silica, the bell 1 being surrounded by a sealed housing 3 enabling the sensor to be put under a vacuum.

Also in conventional manner, the inside surface of the bell 1 is metallized as is its bottom edge, and the bottom edge extends facing two pairs of control electrodes 4 and two pairs of detection electrodes 5 that are suitably connected to a control and detection unit 6 for generating vibration 11 represented by a chain-dotted line in FIG. 2 and of position that is identified by an angle $\theta 0$ relative to a reference electrode 5. The position of the vibration 11 is controlled by the control unit 6 applying precession command to the control electrodes 4.

Figure 3:
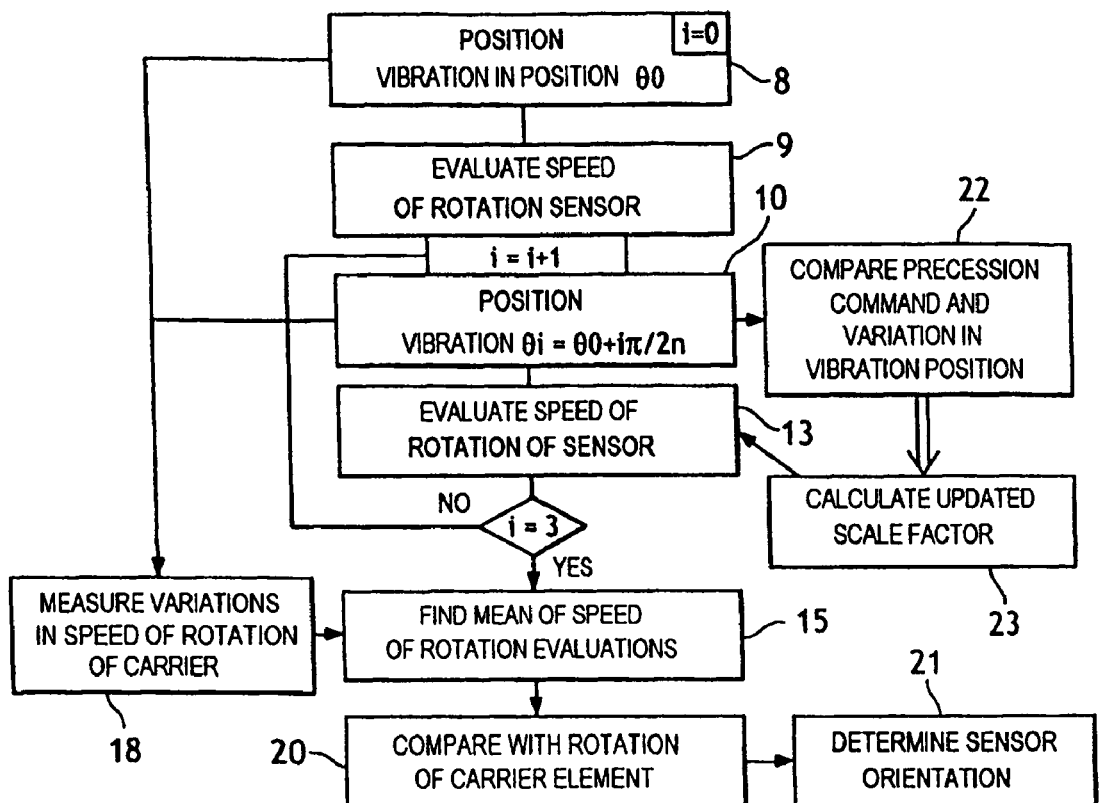
FIG. 3 is a block diagram showing an implementation of the method of the invention and its variant applications.

With reference to FIG. 3, the preferred implementation of the method of the invention comprises a first step 8 of positioning the vibration in a first position $\theta 0$.

For the first position $\theta 0$ of the vibration, the method comprises a step 9 of evaluating the speed of rotation of the sensor. This evaluation of the speed of rotation is performed by using the gyro in known manner either in a free gyro mode or in a rate gyro mode.

In a free gyro mode, a series of measurements are taken of the position of the vibration over a short period of time during which the displacement of the vibration is small relative to the periods of the harmonics of orders 2 and 4. In particular, in the application where the method is implemented to seek north, the gyro is preferably stationary relative to the surface of the Earth, so that the maximum speed of rotation of the gyro is that of terrestrial rotation, i.e. a speed of rotation of 15° per hour (h). If the speed of rotation of the sensor operating in free gyro mode is performed over ten seconds, then the variation in the position of the vibration is completely negligible.

In order to avoid any variation in the position of the vibration and in order to avoid errors due to defective coding of the position of the vibration, it is preferable at low speeds of rotation to perform evaluation in free gyro mode even though the scale factor is less accurate than in rate gyro mode.

A step 10 is then performed of modifying the position of the vibration by applying a precession command to the control electrodes 4 and then the speed of rotation of the sensor in the modified position is then evaluated 13. In the preferred implementation, the vibration is placed 14 in three modified positions $\theta 1$, $\theta 2$, and $\theta 3$ that are respectively offset geometrically from the initial position $\theta 0$ so as to be positioned at angles $\theta i=\theta 0+i\pi/2n$ where i is an integer lying in the range 1 to 3, which for n=2 corresponds to offsets of 45°, 90°, and 135°.

Figure 4:
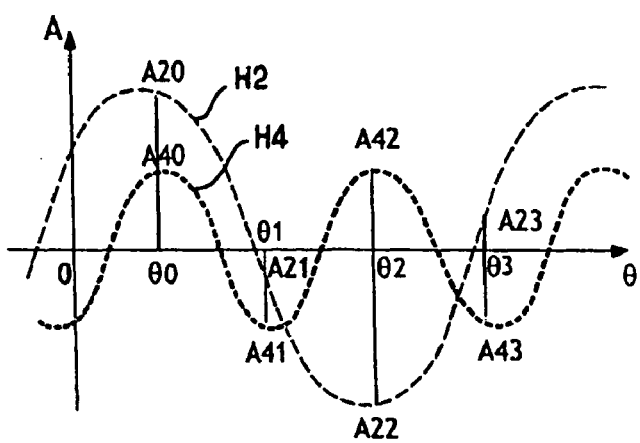
FIG. 4 is a diagram showing the amplitudes of the harmonics of orders 2 and 4 as a function of the position of the vibration relative to a reference electrode.

A mean is then taken 15 between the various evaluations of the speed of rotation of the sensor. As shown in FIG. 4, the amplitude A22 of the harmonic of order 2 for the position $\theta 2$ that is offset by 90° relative to the initial position $\theta 0$ is equal in absolute value and of opposite sign to the amplitude A20 of the harmonic of order 2 in position $\theta 0$.

Similarly, the amplitude A23 of the harmonic of order 2 for the position $\theta 4$ of the vibration has the same value but the opposite sign to the amplitude A21 of the harmonic of order 2 for the position $\theta 1$. While establishing the mean, drift errors due to the second harmonic therefore cancel in pairs.

As for the harmonic of order 4, the amplitudes A41 and A43 for the positions at angles $\theta 1$ and $\theta 3$ are of the same value and of opposite sign compared with the amplitudes A40 and A42 for the vibration positions at angles $\theta 0$ and $\theta 2$. When taking the mean, these four values compensate one another.

The initial position is selected while taking account of the offset positions, so that in each of the positions the corresponding detection signal has a value that is not zero so as to ensure that the analog signals delivered by the detection electrodes 5 are converted with good quality into digital signals.

By way of example, for precession at a speed of 5°/s, about ten seconds are needed to turn the position of the vibration through 45°. About fifteen seconds are also needed to evaluate the speed of rotation in a given position. When making evaluations in four positions, the total time required for evaluation is of the order of one hundred seconds. This time can be shortened at the expense of a small loss of accuracy by performing evaluation in two positions only, a first evaluation corresponding to a first position $\theta 0$ and a second evaluation corresponding to the second position $\theta 2$ offset by 90° from the first position. Under such circumstances, the error due to the harmonic of order 2 is eliminated while the error due to the harmonic of order 4 is maintained. Nevertheless, in this context, it should be observed that contrary to the view shown in FIG. 4 where the harmonic of order 4 is deliberately exaggerated for better understanding, in practice the harmonic of order 4 has an amplitude that is much smaller than the harmonic of order 2. For a hemispherical resonant gyro, the harmonic of order 2 generally gives rise to drift of the order of one degree per hour, whereas the harmonic of order 4 gives rise to drift of the order of one-tenth of a degree per hour.

In this context, it should be observed that the amplitudes of the harmonics of order 2 and of order 4 compensate directly only when the speed of rotation of the gyro is constant throughout the duration of the measurements used for evaluating the speed of rotation.

When the speed of rotation of the gyro is not constant, it nevertheless remains possible to take advantage of the invention. Under such circumstances, it suffices to have means for measuring 18 variations in the speed of rotation and to subtract from these variations the speed of rotation that is evaluated in each position. These steps are implemented for example by a difference gyro 19 connected to the control and detection unit 16 in parallel with the vibrating sensor 7. The difference gyro 19 presents poor accuracy for absolute speed measurement but good accuracy for measuring differences over a very short time.

The difference gyro 19 is preferably implemented by integrating variations measured over the same periods of time as one integration of the speed of rotation measured with the vibrating sensor. The mean giving the final evaluation of the speed of rotation is then obtained very simply by summing the integrals and dividing by the total time for measuring the speed of rotation.

The method of the invention makes it possible in particular to improve the implementation of applications that make use of an evaluation of a constant speed of rotation, in particular for seeking north, or an alignment relative to a reference element.

Figure 5:
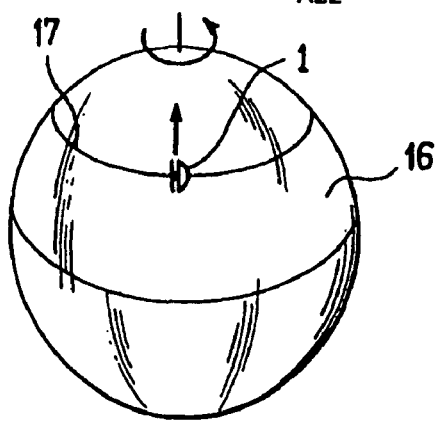
FIG. 5 is a diagram of the terrestrial globe and a vibrating sensor illustrating the invention being applied to seeking north.

FIGS. 3 and 5 show an application to seeking north when the inertial device containing the vibrating sensor 1 is stationary relative to the terrestrial globe 16. Given the rotation of the Earth about the north-south axis, a vibrating sensor 1 having its axis of symmetry extending parallel to a tangent to a parallel 17 passing through the sensor, i.e. in an east-west direction, no rotation is perceived. From an orientation in which the sensor is subjected to a speed of rotation that is not zero, the method implementing the application comprises in conventional manner a step 20 of comparing the speed of rotation of the sensor with the speed of rotation of the reference element, i.e. the rotation of the Earth when the sensor is carried by the ground, and a step 21 of determining the orientation of the sensor by applying trigonometric formulae giving the component of the rotation of the vibrating sensor as a function of its orientation. The accuracy with which the speed of rotation is evaluated using the method of the invention makes it possible to implement this application with improved accuracy for determining north. In order to obtain better accuracy in determining north, the axis of symmetry of the gyro is preferably placed approximately on an east-west direction.

For an alignment of the inertial device prior to navigation, the inertial device preferably has three vibrating sensors with their axes disposed in three orthogonal directions.

According to yet another aspect of the invention, the modification to the position of the vibration for the purpose of evaluating the speed of rotation provides an opportunity to perform a comparison 22 between the precession command and the variation in the position of the vibration, and to perform a calculation 23 of an updated scale factor which can be used immediately for evaluating the speed of rotation of the vibrating sensor.

The various steps of the method of the invention are preferably implemented by software integrated in the control unit 6 which, together with the vibrating sensor, constitutes an inertial device.

Naturally, the invention is not limited to the implementations described and can be embodied in various ways that will appear to the person skilled in the art without going beyond the ambit of the invention as defined by the claims.

In particular, although the applications are described for a vibrating sensor that is stationary relative to the ground, the method of the invention can also be used when the inertial device is installed in a carrier that is movable relative to the ground.

Although the invention is described with reference to a gyro of order 2 (n=2), it applies likewise to a gyro of higher order. The main harmonics to be eliminated are then the harmonic of order n and the harmonic of order 2n such that in order to eliminate as well as possible the error given the anisotropy of the sensor in the various orientations of the vibration, it is desirable to perform a number of evaluations of speed of rotation that is equal to at least twice the order of the periodicity of the elastic line of the sensor by positioning the vibration in succession at angles $\theta i=\theta 0+i\pi/2n$ where i is an integer lying in the range 1 to kn−1 and where k is itself an integer greater than or equal to 1.

Nevertheless, for reasons to do with the time required for implementation, it is generally preferable to limit the number of evaluations of the speed of rotation to two, with a geometrical offset of $\pi/n$ so as to eliminate the harmonic of order n, or four with additional geometrical offsets of $\pi/2n$ and $3\pi/2n$ if it is also desired to eliminate the harmonic of order 2n.

What is claimed is:

1. A method of determining a speed of rotation of an axially symmetrical vibrating sensor having a vibrating member associated with control electrodes and with detection electrodes for generating vibration presenting an elastic line possessing periodicity of order n and having a position that is variable as a function of the rotation of the sensor, the method comprising the steps of:
    performing a first evaluation of the speed of rotation when the vibration is in a first position relative to the control electrodes and the detection electrodes;
    applying a precession command using a pre-established scale factor until the vibration reaches a second position geometrically offset by $\pi/n$ relative to the first position;
    performing a second evaluation of the speed of rotation while the vibration is in the second position; and
    taking a mean of the evaluations of the speed of rotation in the first position and in the second position.

2. A method according to claim 1, further comprising the steps of:
    applying the precession command to bring the vibration successively into offset positions that are geometrically offset by $\pi/2n$ and $3\pi/2n$ relative to the first position;
    performing evaluations of the speed of rotation for said offset positions of the vibration; and
    taking a mean of the evaluations of speed of rotation for all of the evaluations performed.

3. A method according to claim 1, including the steps of performing a number of evaluations of speed of rotation equal to at least twice the order of the periodicity of the elastic line of the sensor by successively positioning the vibration on angles that are offset from the first position by $i\pi/2n$ where i is an integer lying in the range 1 to kn-1, and where k is itself an integer equal to or greater than 1.

4. A method according to claim 1, including a prior step of controlling the positioning of the vibration to occupy angles selected so that a corresponding detection signal has a value that is not zero.

5. A method according to claim 1, including the steps of:
    performing a comparison between the precession command and a corresponding actual variation of angle; and
    deducing therefrom an updated value of the scale factor.

6. A method according to claim 1, including the steps of:
measuring variations in the speed of rotation of the sensor; and
algebraically subtracting the measured variations while establishing the mean of the evaluations of speeds of rotation.

7. An inertial device comprising an axially symmetrical vibrating sensor having a vibrating member associated with control electrodes and with detection electrodes, and means for exciting the sensor so as to generate a vibration, the device including means for performing a first evaluation of the speed of rotation of the sensor while the vibration is in a first position relative to the control electrodes and the detection electrodes, means for applying a precession command using a pre-established scale factor until the vibration reaches a second position offset by $\pi/n$ relative to the first position, where n is a periodicity order of an elastic line of the sensor, means for performing a second evaluation of the speed of rotation of the sensor while the vibration is in the second position, and means for taking a mean between the evaluations of the speed of rotation of the sensor in the first position of the vibration and in the second position of the vibration.

8. A device according to claim 7, further including:
means for applying the precession command to bring the vibration into offset positions that are offset by $\pi/2n$ and $3\pi/2n$ relative to the first position;
means for performing evaluations of the speed of rotation for said offset positions of the vibration; and
means for taking a mean of the evaluations of speed of rotation for all of the evaluations performed.

9. A device according to claim 7, including:
means for making a comparison between the precession command and a corresponding actual angle variation; and
means for deducing an updated value of the scale factor.

10. A device according to claim 7, including:
means for measuring variations of the speed of rotation of the sensor; and
means for algebraically subtracting the measured variations while taking the mean of the evaluations of speeds of rotation.

* * * * *